(12) United States Patent
Nahill et al.

(10) Patent No.: US 8,118,581 B2
(45) Date of Patent: Feb. 21, 2012

(54) INJECTION MOLDING APPARATUS FOR DELIVERING MULTIPLE SHOTS OF MATERIALS TO A PLURALITY OF MOLD CAVITIES

(75) Inventors: Thomas E. Nahill, Amherst, NH (US); Sam Kalmouni, Pembroke, NH (US); Nikhil Mani, Billerica, MA (US); Keith Barker, Candia, NH (US); Brian Lynch, Merrimack, NH (US)

(73) Assignee: Graham Packaging Company, LP, York, PA (US)

( * ) Notice: Subject to any disclaimer, the term of this patent is extended or adjusted under 35 U.S.C. 154(b) by 0 days.

(21) Appl. No.: 13/031,012

(22) Filed: Feb. 18, 2011

(65) Prior Publication Data

US 2011/0212204 A1 Sep. 1, 2011

Related U.S. Application Data

(63) Continuation of application No. 12/686,434, filed on Jan. 13, 2010, now Pat. No. 7,892,462, which is a continuation of application No. 11/443,704, filed on May 31, 2006, now Pat. No. 7,651,644.

(51) Int. Cl.
*B29C 45/77* (2006.01)
(52) U.S. Cl. .......... 425/130; 425/145; 425/533; 425/572
(58) Field of Classification Search .................. 425/145, 425/533, 572, 588, 130; 264/40.1, 40.3, 264/40.7
See application file for complete search history.

(56) References Cited

U.S. PATENT DOCUMENTS

| 3,982,440 | A | | 9/1976 | Groleau et al. |
|---|---|---|---|---|
| 4,151,247 | A | * | 4/1979 | Hafele ..................... 264/328.16 |
| 4,950,143 | A | | 8/1990 | Krishnakumar et al. |
| 4,990,301 | A | | 2/1991 | Krishnakumar et al. |
| 6,062,840 | A | | 5/2000 | Lee et al. |
| 6,824,379 | B2 | | 11/2004 | Doyle et al. |
| 6,911,166 | B2 | | 6/2005 | Neal |

(Continued)

FOREIGN PATENT DOCUMENTS

CA 2331576 A1 11/1999
(Continued)

OTHER PUBLICATIONS

International Search Report and Written Opinion mailed Nov. 6, 2007 in corresponding application PCT/US2007/070044.

*Primary Examiner* — Timothy Heitbrink
(74) *Attorney, Agent, or Firm* — Rissman Hendricks & Oliverio, LP

(57) ABSTRACT

Method and apparatus for controlling the delivery of polymer material in a sequential injection molding process. In one embodiment, the method provides: delivering a first shot of a first material simultaneously to a plurality of mold cavities; independently sensing for each cavity a property that is indicative of a volume or flow of material that is delivered to the corresponding cavity during the step of delivering the first shot; independently stopping the step of delivering the first shot to one or more cavities according to a program that uses as a variable a signal indicative of the property sensed for the corresponding cavity during delivery of the first shot; and delivering a second shot of a second material simultaneously to the cavities subsequent to the step of stopping the step of delivering the first shot.

12 Claims, 10 Drawing Sheets

U.S. PATENT DOCUMENTS

| | | | |
|---|---|---|---|
| 7,128,865 B2 * | 10/2006 | Martin | 264/318 |
| 7,651,644 B2 * | 1/2010 | Nahill et al. | 264/40.1 |
| 7,892,452 B2 * | 2/2011 | Ryowa et al. | 252/301.4 R |
| 2003/0012837 A1 | 1/2003 | Siano | |
| 2004/0185142 A1 | 9/2004 | Olaru | |
| 2005/0082707 A1 | 4/2005 | Sabin et al. | |
| 2006/0029691 A1 | 2/2006 | Sabin et al. | |

FOREIGN PATENT DOCUMENTS

| | | |
|---|---|---|
| DE | 4021856 A1 | 1/1991 |
| DE | 29909535 U1 | 8/1999 |
| JP | 05253973 A | 10/1993 |
| JP | 07009478 A | 1/1995 |
| WO | WO9959795 A | 11/1999 |

* cited by examiner

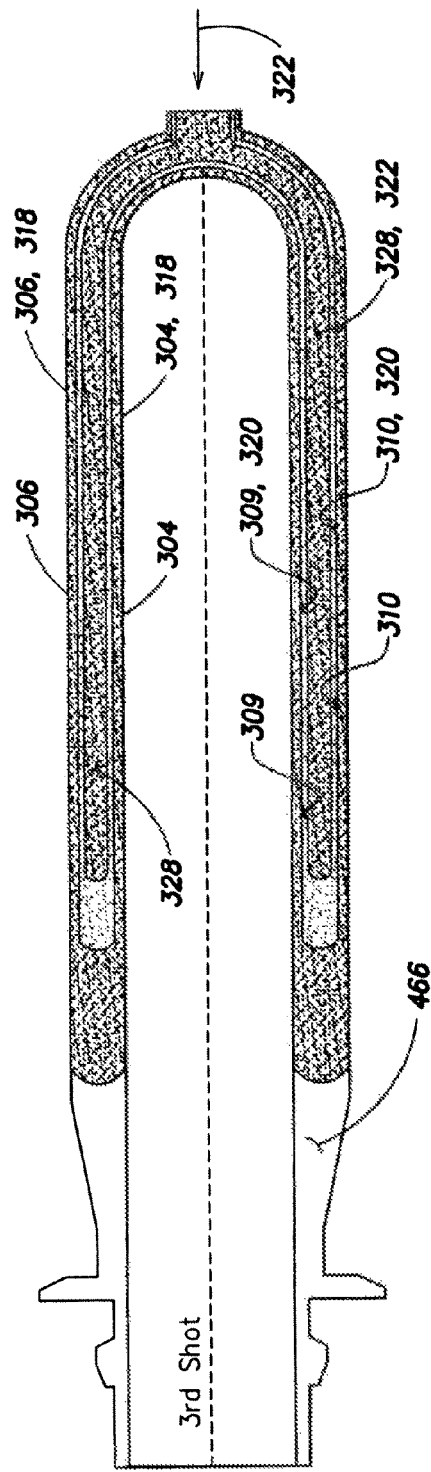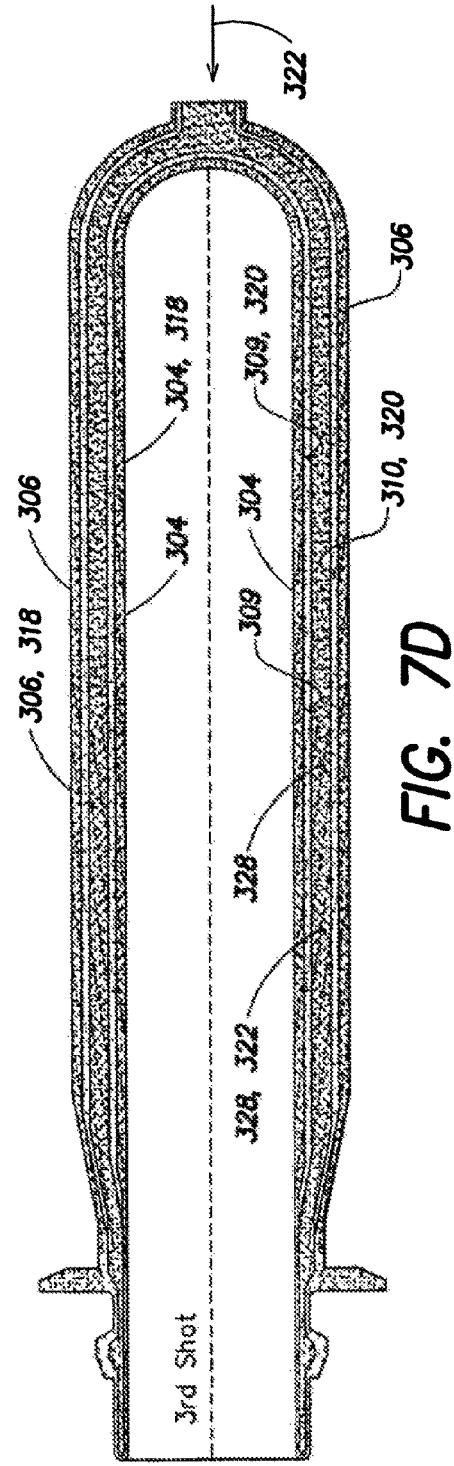

INJECTION MOLDING APPARATUS FOR DELIVERING MULTIPLE SHOTS OF MATERIALS TO A PLURALITY OF MOLD CAVITIES

FIELD OF THE INVENTION

The present invention relates to controlling one or more of a volume or flow of a first shot of polymer material delivered to a mold in a sequential injection molding process. In a particular embodiment, the invention relates to controlling the simultaneous injection of a first shot of polymer material to a plurality of cavities in a sequential process.

BACKGROUND OF THE INVENTION

Injection molding processes for performing sequential shots of different polymer materials are well known. To accomplish such processes, injection molding apparati have been developed using hotrunner systems that are designed to deliver sequential shots of polymer material both to a single cavity and to a plurality of cavities. In multi-cavity applications, shots are intended to be delivered at the same time in the same amounts and at the same rates of flow by controlling the length and configuration of the hotrunner flow channels and the temperature of various portions of the hotrunner and the injection nozzles and the mold cavity itself. However, in practice, it is very difficult to achieve such uniform delivery to multiple cavities.

When shots of plastic materials are delivered in sequence to even a single cavity, it can be difficult to obtain consistency in the precise amount of the shots from one cycle to the next. When shots are routed through multiple flow channels in a hotrunner leading to multiple cavities, it is even more difficult to maintain precise control over the pressure within any given channel or injection nozzle or mold cavity and thus the rate and/or volume of material flow to any particular one of the plurality of cavities will vary. When a single source of polymer material injection is used to effect flow through all channel paths to each mold cavity, pressure will vary between the flow paths even at points within different channels that are located the same distance (path length) from the source of injection. Performing two or more shots of material one after the other further increases the degree of difference of volume of polymer material that is delivered to different cavities in each shot. Still further, changes in the polymer material(s) over time (e.g., different batches, sources, temperatures, moisture content) can alter the flow characteristics even for a specific hotrunner/cavity path.

Prior systems describing typical sequences of injecting sequential shots of first, second and/or third shots of polymer materials into mold cavities and the apparati used to effect such multi-cavity injection are set forth in U.S. Pat. Nos. 4,550,043; 4,609,516; 4,710,118; 4,781,954; 4,950,143; 4,990,301; 4923,723; and 5,098,274, the disclosures of all of which are incorporated herein by reference as if fully set forth herein.

SUMMARY OF THE INVENTION

In accordance with one embodiment of the invention there is provided a method of delivering multiple shots of material to a plurality of mold cavities, the method comprising:

delivering a first shot of a first material simultaneously to a plurality of mold cavities;

independently sensing for each cavity a property that is indicative of a volume or flow of material that is delivered to the corresponding cavity during the step of delivering the first shot;

independently stopping the step of delivering the first shot to one or more cavities according to a program that uses as a variable a signal that is indicative of the property sensed for the corresponding cavity during delivery of the first shot; and delivering a second shot of a second material simultaneously to the cavities subsequent to the step of stopping the step of delivering the first shot.

Each cavity can have a corresponding nozzle fluidly communicating with the cavity and having a first bore for delivery of the first shot, the nozzle having a valve pin adapted to open and close the first bore, and the step of independently stopping the first shot comprising closing the first bore.

In one or more embodiments, the step of delivering the second shot may comprise delivering the second shot subsequent to stopping delivery of the first shot to all of the plurality of cavities. The step of delivering the first shot may comprise delivering the first material to all of the plurality of cavities from a single source of injection. The step of delivering the second shot may comprise delivering the second material to each cavity from a separate source of injection.

In one or more embodiments, the step of independently sensing may comprise sensing a property of the first material at one or more selected locations of flow, wherein the program uses a signal indicative of the sensed property at the one or more locations to either calculate flow rate or fill volume of the first material or to compare the signal or a value calculated from the signal to a target value. The target value may be a minimum value or a range of values. In one embodiment, the property of the first material is sensed at a single location of flow. In another embodiment the property of the first material is sensed at two locations of flow.

The step of independently sensing preferably comprises sensing one or more of a pressure, a temperature, a flow rate, an optical property, a fill volume or level of the first material into or in the cavity.

In another aspect of the invention, there is provided an injection molding apparatus comprising:

a plurality of mold cavities, each cavity communicating with a corresponding nozzle that delivers two or more materials to its corresponding mold cavity;

each nozzle having a corresponding valve and communicating with a source of pressurized feed of the two or more materials;

a drive mechanism that drives one or the other or both of the sources of pressurized feed and each valve for each nozzle, the drive mechanism starting and stopping flow of each of the two or more materials in a predetermined sequence through the nozzles;

a controller interconnected to the drive mechanism, the controller including instructions for directing the drive mechanism to operate to deliver at least a first shot of a first material and a second shot of a second material after the first shot;

one or more sensors associated with each cavity adapted to sense a property indicative of a volume or flow of the first material that is delivered to the corresponding cavity; and the controller being adapted to receive signals from the sensors and including a program having instructions for using the received signals as a variable to enable and stop the flow of the first shot of the first material to each cavity to achieve a predetermined volume of the first material in each cavity.

Each nozzle can have first and second bores for delivering the first and second materials respectively to the corresponding cavity, each valve including a pin that reciprocates between open and closed positions. In the closed position both the first and second bores are closed; the open positions include at least first and second open positions wherein in the first position the first bore is open and the second bore is closed, and in the second position the first bore is closed and the second bore is open, the program using the first signal as a variable to direct the pin to move between positions.

In various embodiments, one or more sensors are disposed at one or more locations of the flow of the first material in or into each corresponding cavity. The program includes instructions that use the signal from a sensor that is indicative of the sensed property of the one or more locations to either calculate flow rate or fill volume of the first material or to compare the signal or a value calculated from the signal to a target value. The one or more locations may be within a bore of the nozzle or within a corresponding cavity or within the manifold/hotrunner. In one embodiment, a single sensor is disposed at one location for each cavity. In another embodiment, at least two sensors are disposed at two locations for each cavity.

The sensor typically comprises at least one of a pressure sensor, a temperature sensor, a flow meter, an optical sensor, a fill volume or location sensor, or the like.

In another embodiment, a method is provided for delivering multiple shots of material to a mold cavity, the method including the steps of:

delivering a first shot of a first material to the mold cavity;

sensing a property that is indicative of a volume or flow of first material that is delivered to the cavity during the step of delivering the first shot;

stopping the step of delivering the first shot to the cavity according to a program that uses as a variable a signal indicative of the property sensed during delivery of the first shot; and delivering a second shot of a second material to the cavity subsequent to the step of stopping the step of delivering the first shot.

In this embodiment, the method may be used to control delivery of the first shot while forming a plurality of articles in the mold cavity, i.e., during two or more sequential molding cycles. The method also enables providing at least a predetermined amount of a first shot over sequential molding cycles when there has been a change in one or more properties of the first material, such as an alteration in intrinsic viscosity, moisture content, molecular weight, temperature, or other variations in the material.

In one or more embodiments, the valve pins are individually controlled to determine a completion of the first shot in the corresponding cavity. In other embodiments, the valve pins are used to determine an intermediate point during the filling of the corresponding cavity with the first material.

In various embodiments, the valve pins, which previously were only used by all opening at the start of a cycle and all closing at the end of an injection hold time, can now perform the intermediate step of individually closing to stop flow to certain cavities under the direction of a controller (e.g., microprocessor).

In one embodiment, a three-position valve pin is provided movable to an intermediate position, wherein the first shot material flow is stopped, but other material(s) are not blocked. While the other materials are flowing, all valve pins to the cavities would be in the intermediate position.

In another embodiment, a two-position valve pin is provided. In this embodiment, by stopping the flow of the first shot to a corresponding cavity, all flow to the cavity is blocked. The valve pin then needs to be reopened before any of the material can enter the corresponding cavity.

In one embodiment, a two-material (2M) three-layer (3L) article is formed. After completion of the first shot, the valve pins would either open (two-position valve) or stay in the intermediate position (three-position valve) for the second material to be injected. After the second material is injected, all valve pins would open for a small last shot of the first material to clear the gate of the second material (enclosing the second material as an interior layer). This embodiment would not utilize any shooting pots.

In another embodiment, a two-material (2M) five-layer (5L) article is formed. After completing the first shot, the valve pins would either open (two-position valve) or stay in the intermediate position (three-position valve) for the second material to be injected. After this, all valve pins would open fully while the remainder of the cavity is filled and packed. Shooting pots may or may not be used for the second material.

In another embodiment, a three-material (3M) five-layer (5L) article is formed. After completing the first shot, the valve pins would either open (two-position valve) or stay in the intermediate position (three-position valve) for the second material to be injected. The valve pins would stay in this position while the third material is injected. Shooting pots may or may not be used for the second and third shots.

In some embodiments, it may be determined that several cavities share substantially the same filling rate or volume and can be combined on the same control circuit, thus simplifying the apparatus by reducing the number of sensors and valve control circuits needed.

One method of detecting the flow rate in a cavity is from one or more sensors located in a part of the cavity which will be occupied by the first shot, i.e., detecting the presence of the melt at that location. These sensors can be exposed to the melt, or disposed just below the molding surface. For example, optical sensors, such as fiber optic, can be incorporated into the molding surface. Temperature sensors or sensors of another type can be positioned at the surface or just below the molding surface.

In one embodiment, two sensors are located at different points along the direction of the flow path of the first shot in the cavity. The time period for flow between the sensors would be a direct measurement of the flow rate. Alternatively, using a single sensor per cavity, the flow rate could be calculated based on the start time of injection.

In select embodiments, the flow rate may be detected based on temperature sensors located in a high shear area, such as at the gate.

In another embodiment, the controller may be operatively disposed to control a first shot injection unit, directing the unit to slow down delivery as the valve pins are closing. Furthermore, it may control the injection unit to stop the flow when all valve pins are closed. The controller may also generate a signal to open the valve pins.

The processes and apparati of various embodiments may be used in the manufacture of multilayer plastic articles such as preforms, bottles and other packaging articles. The polymer materials injected typically comprise one or more structural polymers and/or optionally one or more specific functional polymers, for example high temperature, gas barrier or scavenging materials. The structural material is typically injected as the first shot and then a gas barrier, scavenging or recycled (e.g., reprocessed scrap or post consumer) material is injected as the second shot. As a third shot, either a structural, specific functional, or recycled material may be used.

BRIEF DESCRIPTION OF THE DRAWINGS

The above and further advantages of the invention may be better understood by referring to the following description in conjunction with the accompanying drawings in which:

FIGS. 7A-7D are schematic side cross-sectional views of a single mold cavity showing the progress of travel of polymer material flow into the cavity as a result of first, second and third shots of polymer materials that are sequentially injected to form a five-layer article;

DETAILED DESCRIPTION

Figure 1:
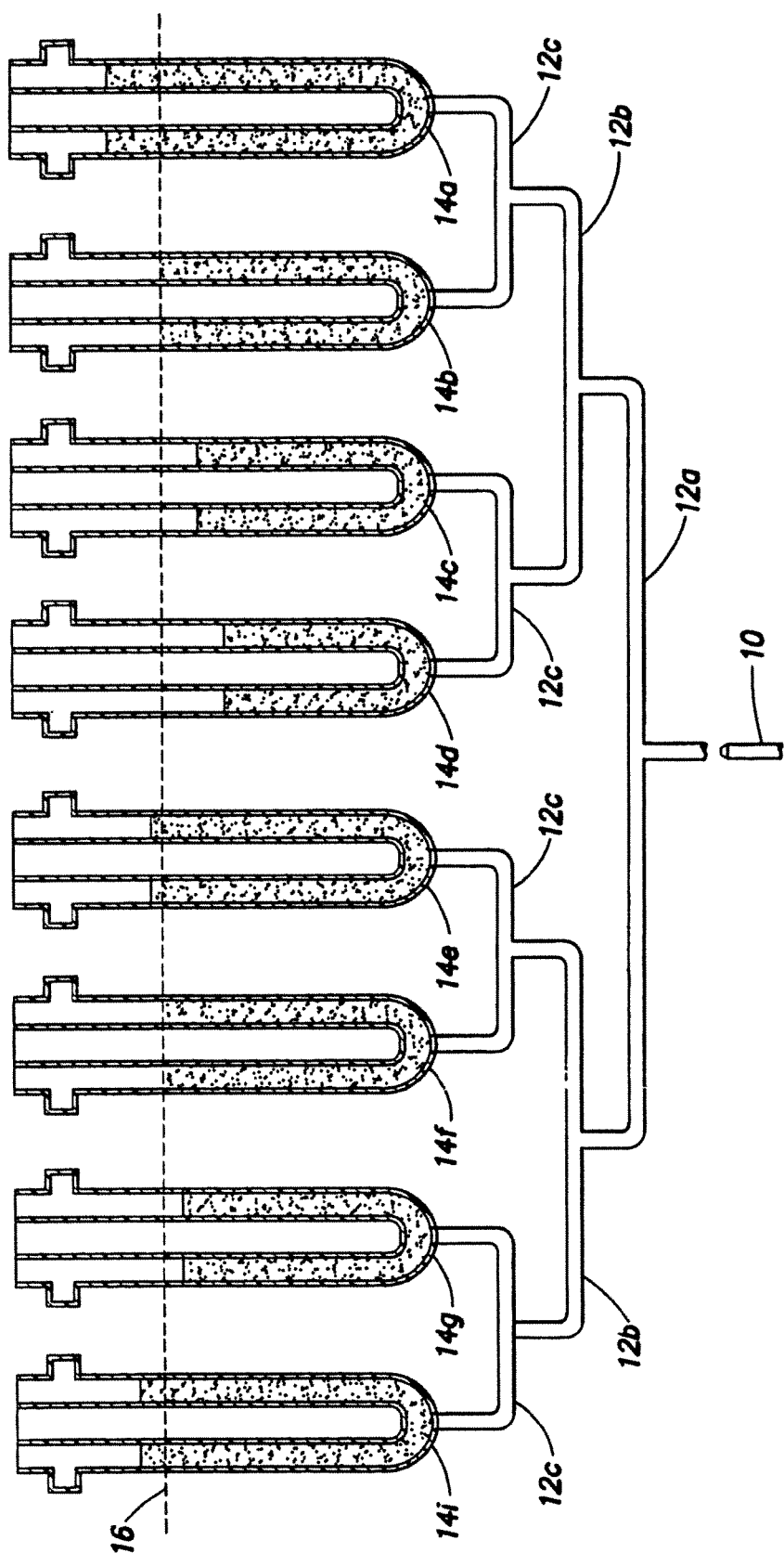
FIG. 1 is a schematic view of a multi-cavity mold system where each mold cavity fluidly communicates via a hotrunner channel system with a common source of pressurized fluid material, each mold cavity filling at a different rate during a single injection cycle.

FIG. 1 shows a mold system having a multiplicity of essentially identically shaped cavities 14a-14i that are fed by a single source of polymer material injection 10. The system shown in FIG. 1 does not include shooting or metering pots to assist in controlling the amount or pressure of material flow to each cavity but rather uses only the single source 10 of injection that provides all of the pressure by which the injected polymer material is forced to flow through all of the various and different manifold channels 12a-12c and into all of the multiple number of cavities 14a-14i. As shown, the forward-most progress of travel of polymer material into each cavity 14a-14i is different for each cavity, the top or leading edge level of polymer material within each cavity varying in distance either above or below travel line 16 as shown in FIG. 1. These differences in rate and volume of material filling of identically shaped cavities arises out of minor differences in the size, shape, length and temperature of the path of channel travel from the source 10 through the channels 12a-12c to the separate cavities, as well as minor differences in the cavities 14a-14i themselves. Such differences in flow rate can be caused by very small differences between channel paths or cavities (e.g. tenths of millimeters in length or diameter or fractions of a degree in temperature) but such differences still result in the differences in fill rate among different cavities as shown in FIG. 1. Even small differences in fill rate can have a significant effect on the structure of the molded articles, e.g. the location of an interior barrier layer in a multilayer preform.

Figure 5A:
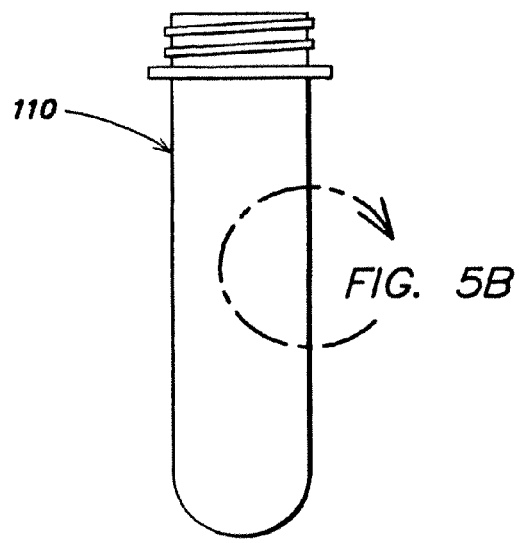
FIG. 5A is a schematic side cross sectional view of a three-layer preform and FIG. 5B is an enlarged fragmentary sectional view of a portion of the multilayer wall of the preform.
Figure 5B:
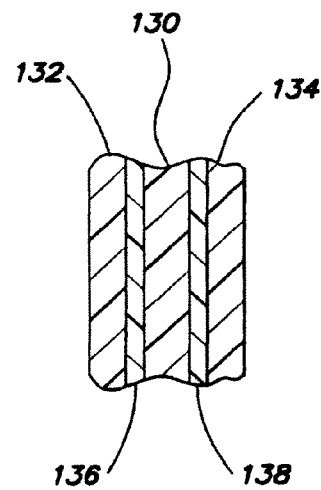
Figure 6A:
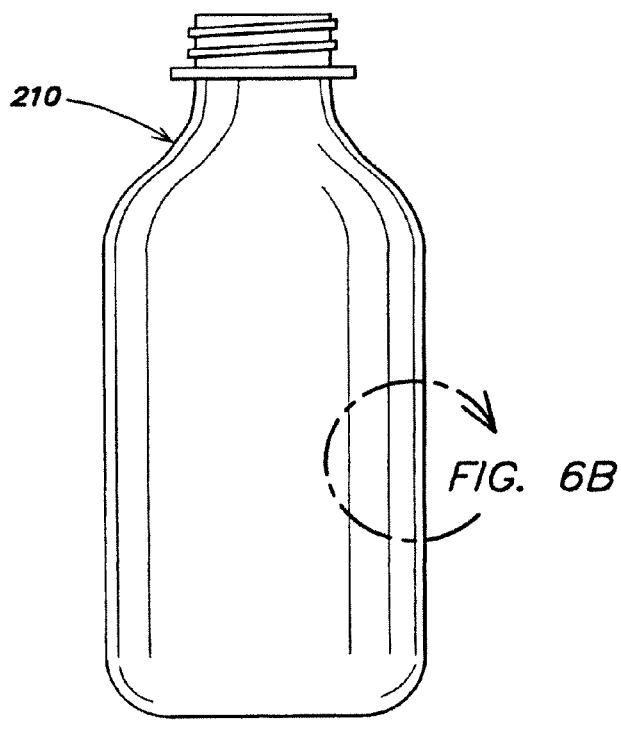
FIG. 6A is a schematic side cross sectional view of a blown bottle made from the preform of FIG. 5A
Figure 6B:
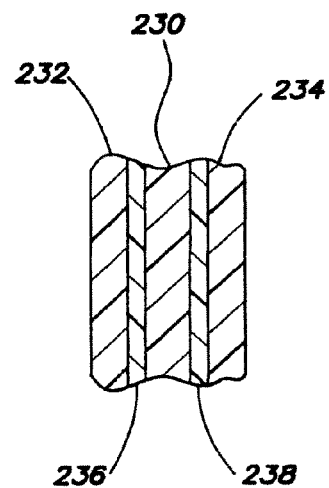
FIG. 6B is an enlarged fragmentary sectional view of a portion of the wall of the bottle showing more specifically the multilayer wall of the bottle.

Methods and apparati for carrying out sequential first, second and third shots of materials arise in a variety of contexts pertinent to the present invention and are described by way of the following examples. A typical embodiment of a three-material (3M), five-layer (5L) molded article is illustrated in FIGS. 5A, 5B, 6A and 6B. A multilayered preform 110 manufactured by an injection molding process is shown in FIG. 5A. The multilayered preform 110 has a central core layer 130, intermediate interior layers 136 and 138 on opposite sides of the core layer, and exterior inner 132 and outer 134 layers. The bottle 210 shown in FIG. 6A is made from preform 110 by a blow molding process. Similar to the preform the wall of the bottle has a core layer 230, exterior inner and outer layers 232, 234 and interior intermediate inner and outer layers 236, 238. In a typical embodiment of a multilayer preform and/or bottle, the core 230 and exterior layers, 232, 234 of the FIG. 6B bottle and/or the preform layers 130, 132, 134, FIG. 5B, are comprised of a structural polymer. The intermediate layers 236, 238 or 136, 138 is/are typically comprised of another polymer such as a barrier or scavenging polymer as is well known in the art. Injecting the first structural layer material in a precisely desired amount to each one of a multitude of mold cavities is important to achieving a proper layering within the cavities of a second injected material relative to the first injected material as shown schematically in FIGS. 7A-7D. Typical examples of multilayered preforms, bottles and packages and the specific compositions of the various layers of such multilayer objects are disclosed in U.S. Pat. Nos. 4,781,954; 4,863,046; 5,599,496 and 6,090,460, the disclosures of all of the foregoing of which are incorporated herein by reference in their entirety.

Figure 7A:
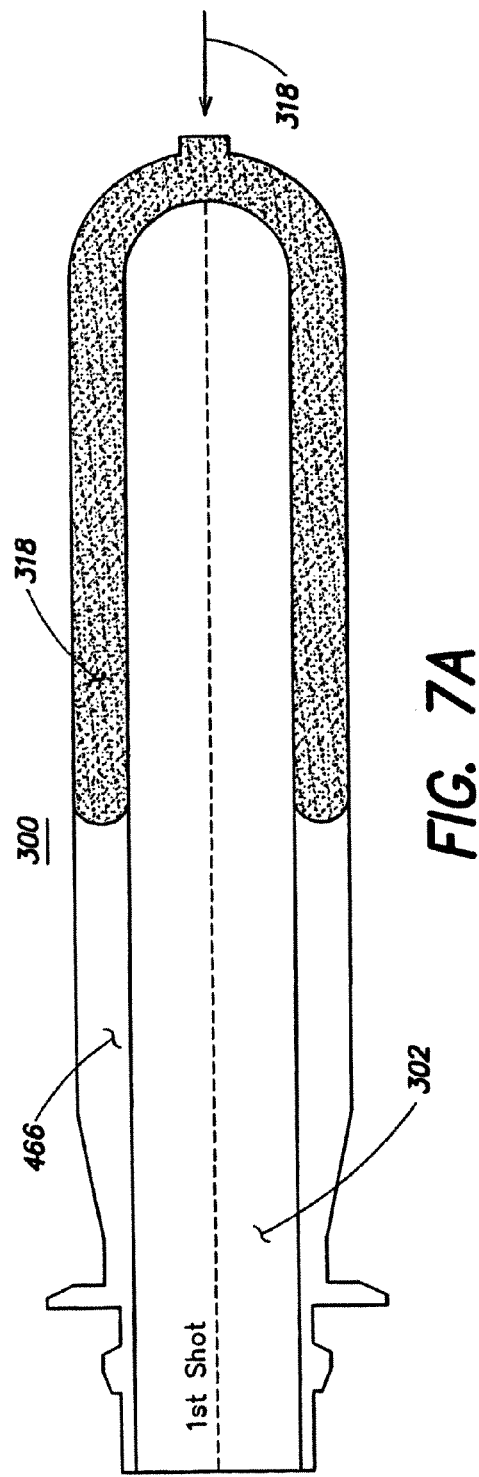
Figure 7B:
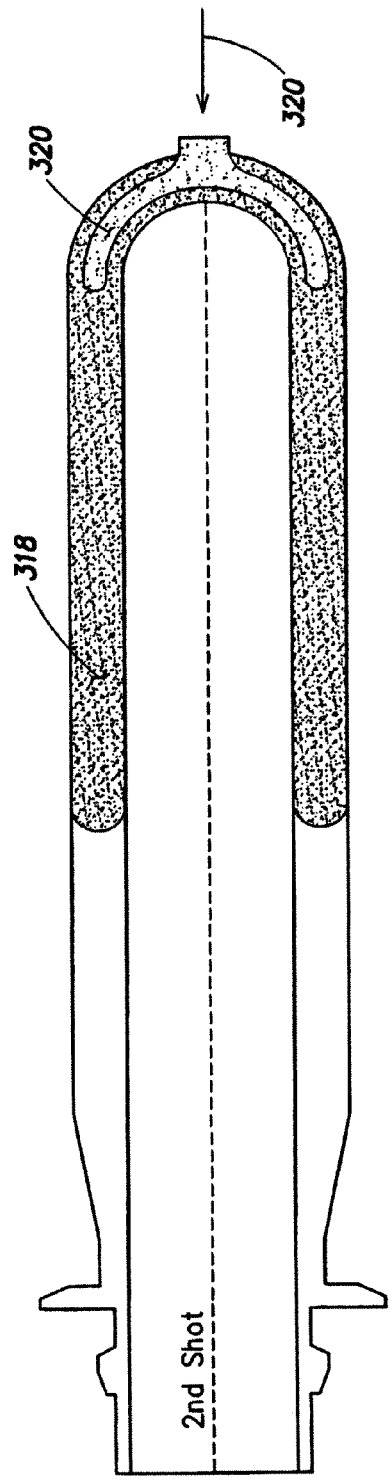

FIGS. 7A-7D schematically show a typical three-shot multilayer injection molding process for forming the five-layer, three-material preform of FIGS. 5A and 5B. The preform is formed in a mold cavity 466 between an outer mold 300 and core 302 of a conventional injection mold. A first shot of first polymer material 318 is injected into the lower end (gate) of the mold cavity and as it flows through the mold cavity 466, due to the relatively cool temperature of the outer mold 300 and core 302, there will be solidification of the first polymer material both externally and internally of the mold cavity to define inner 304 and outer 306 layers (layers 132 and 134 in FIG. 5B) of the first material. In FIG. 7A, the first material has progressed part way up the mold cavity walls. As shown in FIG. 7B, a second shot 320 of a second polymer material, e.g., a barrier material, is injected into the bottom of the mold cavity 15. The relatively small amount of barrier material 320 may pool at the lower end of the cavity. A third shot 322 of a third polymer material is then injected into the gate at a pressure which causes the second shot material 320 to be pushed up the mold cavity and form inner and outer intermediate layers 309, 310 of the preform (layers 136 and 138 in FIG. 5B), while the third material 322 forms a central core layer 328 in FIGS. 7C, 7D (layer 130 in FIG. 5B). The tunnel flow of the second 320 and third 322 shots between the exterior layers 304 and 306 enables the formation of relatively uniform and thin interior layers 309 and 310 of the barrier material 320, and a thicker layer of material 322 in the core layer 328. Finally, the advancing layers reach the end of the mold cavity, producing the five layer preform structure shown in FIG. 7D. Alternatively, the interior layers 309, 310 and 328 may extend only partially up the preform wall and terminate, for example, below the preform neck finish 114. This process is described by way of example only, and is not meant to be limiting; many other processes may be used to form multilayer articles, including articles other than preforms.

Figure 3:
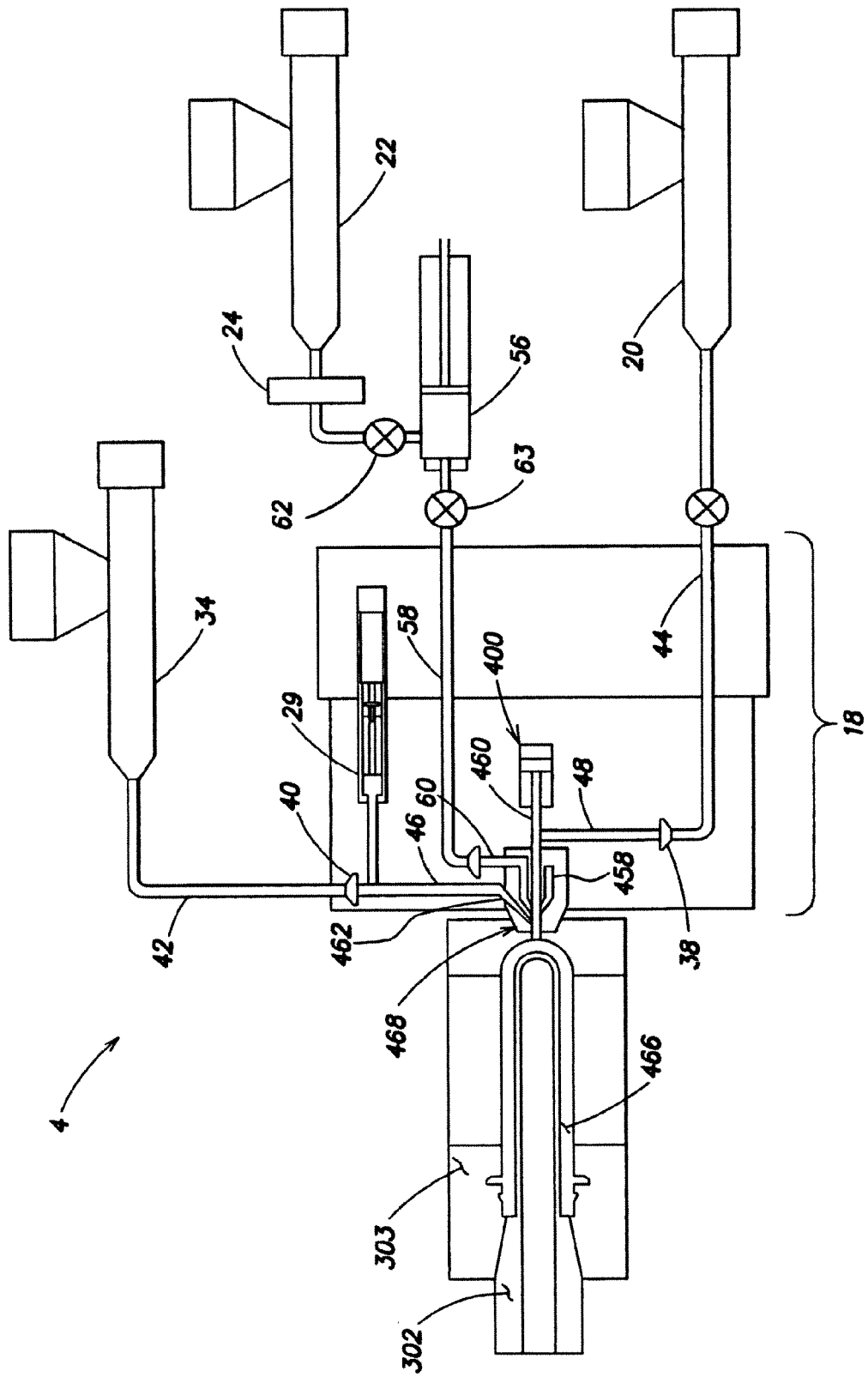
FIG. 3 is a schematic view of a multi-cavity injection mold system, showing a single cavity, where three different materials are controllably injected into each cavity.

FIG. 3 shows part of an injection molding system for carrying out a three shot process, e.g., for making a five-layer article as described with reference to FIGS. 7A-7D. The system 4 of FIG. 3 includes a mold core and cavity set 302, 303, an associated nozzle 468 and actuator 400, a manifold 18, and three separate sources 20, 22, 34 of polymer materials. For purposes of discussion, only one molding cavity 466 is shown in FIG. 3. A first shot of first (e.g., structural) polymer material is fed by a screw/barrel 20 to either a single cavity or to each of a multiple number of cavities through a common feed manifold channel 44. As shown, the common feed channel 44 communicates with individual feed channel 48 by valve 38. The feed channel 48 communicates with a central axial bore 460 of nozzle 468 (shown in FIG. 3 and a more specific example of a nozzle design in FIGS. 8A-8C). Nozzle bore 460 delivers the first shot to gate 464 (FIGS. 8A-8C) which serves as the entrance to cavity 466. An actuator 400 connected to a valve pin 450 controls the opening and closing of all of the nozzle bores 458, 460, 462 (FIGS. 3 and 8A-8C) according to a predetermined program. As described in detail below, a predetermined intermediate or end point (conclusion) of the first shot of material is determined as a result of the sensing of a property of the amount or flow of the first shot of first material in or into the mold cavity 466. The actuator 400 is shown only schematically in FIG. 3. Actuator 400 can be a single piston/chamber actuator as shown in the specific embodiment of FIGS. 8A-8C, a multiple piston/chamber, or another known actuator design suitable for use in injection molding valve pin applications.

A second shot of a second selected polymer material, e.g. an oxygen barrier or scavenging material, is next performed subsequent to the first shot. In a single cavity application, the second shot is commenced upon completion of the first shot. In a multiple cavity application, the second shot is preferably begun only after the first shot is completed in each/all of the multiplicity of cavities as detected by sensors. In a multiple cavity application the second shot is commonly fed to a multiplicity of cavities by screw/barrel 34 via a common feed manifold channel 42 that fills metering pots 29 in the embodiment shown. The common feed channel 42 communicates with individual feed channel 46 via valve 40. Valve 40 is closed at the start of the second shot (and preferably at the conclusion of the first shot) to separate and close off channel portion 46 and metering pot 29 from communication with the rest of the system such that metering pot 29 can separately control the fluid material pressure in the cavity 466 and its associated nozzle channel 462. In the embodiment shown, metering pots 29 are used to deliver a precise amount of the second material to each cavity 466. In an alternative embodiment, metering pots 29 can be eliminated and delivery of the second material can be carried out exclusively via screw/barrel 34. In the one embodiment shown, the individual feed channel 46 communicates with a central axial feed bore 460 of nozzle 468 that feeds the same gate 464 (FIGS. 8A-8C) and cavity 466 as the first shot. The metering pots 29 for feeding individual cavities are typically arranged and adapted to be mounted on the hotrunner or manifold 18 portion of the system 4 such that the individual metering pots 29 can be readily configured to fluidly communicate with each separate manifold channel portion 46 that separately communicates with an individual cavity 466.

In a three-shot, three-material process, a third shot is injected subsequent to the second shot. As shown in FIG. 3, the source of the third feed material 22 is provided with a common machine metering pot 56. The common metering pot 56 can be mounted on the injection mold machine itself (as opposed to the manifold 18) for purposes of acting as a source of stored and ready material for simultaneous feed to all of a multiplicity of cavities. Such a stored intermediate volume of material as in pot 56 is typically employed to ensure that a sufficient amount of material is available in the system for injection during the course of an injection cycle that is relatively short in time duration, i.e. due to the shortness in time duration of a cycle, a machine screw/barrel may not be able to produce sufficient molten polymer material; the pot 56 thus acts as an internal reservoir of material ready to replenish the system for the next cycle. In the embodiment shown in FIG. 3, the machine metering pot 56 is fluidly connected to the screw/barrel 22 for injecting the selected third material as a third shot (FIGS. 7C, 7D). As can be readily imagined such a machine metering pot could alternatively also be provided in connection with the operation of feed barrels 20, 34.

In the embodiment shown in FIG. 3 (and FIGS. 8A-8C), the third shot is delivered to cavity 466 through the same gate 464 via a third bore 458 provided in the nozzle 468. In a single cavity application, the third shot is delivered subsequent to completion of the second shot. In a multi-cavity application, the third shot is preferably begun to all cavities after all of the metering pots 29 to all of the multiple cavities have discharged/injected their contents to the individual feed channels 46. Alternatively, the third shot can be commenced at the conclusion of a predetermined amount of time in which it is assumed that the second shot has been completed to all cavities. Prior to the start of the third shot, the machine metering pot 56 is filled and the valve 62 closed. Valve 63 is then opened to commence the third shot to all cavities. The common manifold channel portion 58 communicates with and allows simultaneous injection to all of the multiplicity of cavities. The purpose of the machine metering pot 56 is to ensure that an excess of fluid material is always present in the system between the screw/barrel 22 and the cavities and ready for injection from one injection cycle to the next.

Each of the multiplicity of cavities communicates with the common manifold channel 58 via a separate or individual manifold channel portion such as channel portion 60 that communicates with the third separate bore 458 in the nozzle 468. Bore 458, like the other nozzle bores, communicates with the gate 464 of cavity 466. The third separate bore 458 is radially offset from the central axial bore 460 but terminates at and feeds the gate 464 to the cavity 466.

Figure 4:
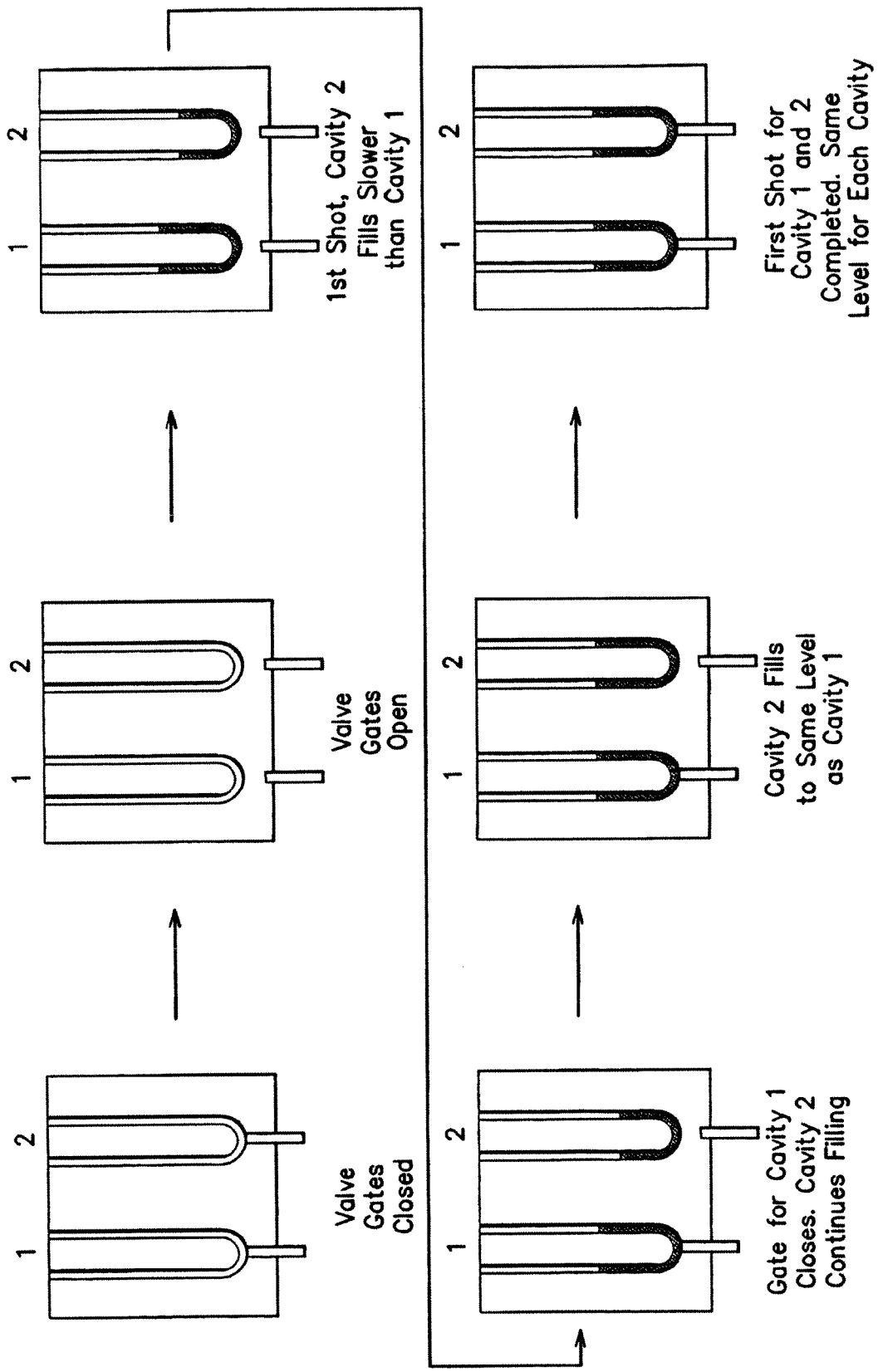
FIG. 4 is schematic side view of two separate cavities that are fed by a common source of polymer material injection, showing the progress of travel of injected polymer material in each cavity during the course of a single shot of material.

In a multilayer process where the first shot comprises a structural polymer material and the second shot comprises an oxygen scavenging/barrier material, it is particularly desirable to ensure that the first shot of material is uniform in volume among all of the multiplicity of cavities. As shown in FIG. 4, the amount of material that fills two different cavities can vary over the course of the cycle time of the first shot. As illustrated in FIG. 4 (starting on the left-hand side), shortly after the valve gates are open, the first shot initially fills one cavity (cavity 2) at a slower rate than another identical cavity (cavity 1) due to differences in the channel or nozzle or cavity size, or in the temperature of the manifold channels, the nozzle or the mold bodies associated with the two identical cavities. The object in such a multilayer or multimaterial injection process is to achieve identical or as close to identical fill volumes as possible in each cavity of a multi-cavity system in the first shot of material.

The desired end result of equalization illustrated (on the right-hand side of FIG. 4) can be achieved according to this embodiment of the invention by separately controlling the fill volume and/or rate of each individual cavity using separate valves for each cavity that are controlled by a controller that senses when each cavity has reached a certain fill volume or otherwise determines the fill/flow rate. Such control over the fill of individual cavities can be effected by monitoring a property of either the material flowing into each individual cavity or by monitoring a property within each individual cavity or the nozzle or mold body associated with each individual cavity that is indicative of the flow rate or the actual volume of material flowing into or that has flowed into each individual cavity at any given point in time during the injection cycle. The monitored or sensed property can then be used as a factor for determining when the mold cavity has reached a predetermined fill volume. Once such a determination is made, the injection process for the first shot of material can be continued for certain period of time, or stopped, when the property being sensed has reached a predetermined value. As shown schematically in FIG. 2, each separate cavity or the mold body or the nozzles or a portion of the manifold associated with each separate cavity has at least one associated sensor S1, S2, S3, S4 that senses and generates a signal indicative of the rate of flow or volume of material flowing to or into each cavity.

In one embodiment, the sensors S1-S4 are interconnected to a controller (e.g., microprocessor or computer) 28 that is, in turn, interconnected to a multiplicity of valves 24a, 24b, 24c, 24d that control the feed of a pneumatic or hydraulic drive fluid to and from a multiplicity of actuators 26a, 26b, 26c, 26d that drive valve pins 27a-27d. As can be readily imagined a single sensor or a single set of sensors can be employed in connection with a single cavity such that the controller 28 controls delivery to the single cavity. In the embodiments shown and described, multiple cavities are controlled simultaneously. As described in detail below the actuators 26a-26d control the axial positioning of the valve pins 27a-27d within a plurality of injection nozzles, such as nozzle 468 of FIG. 3. Depending on the precise axial position of the pins 27a-27d within the nozzles, the operation of which are controlled by controller 28, the flow of the first, second and third polymer materials can be modified, stopped or started at any selected point in any given injection cycle.

Figure 2:
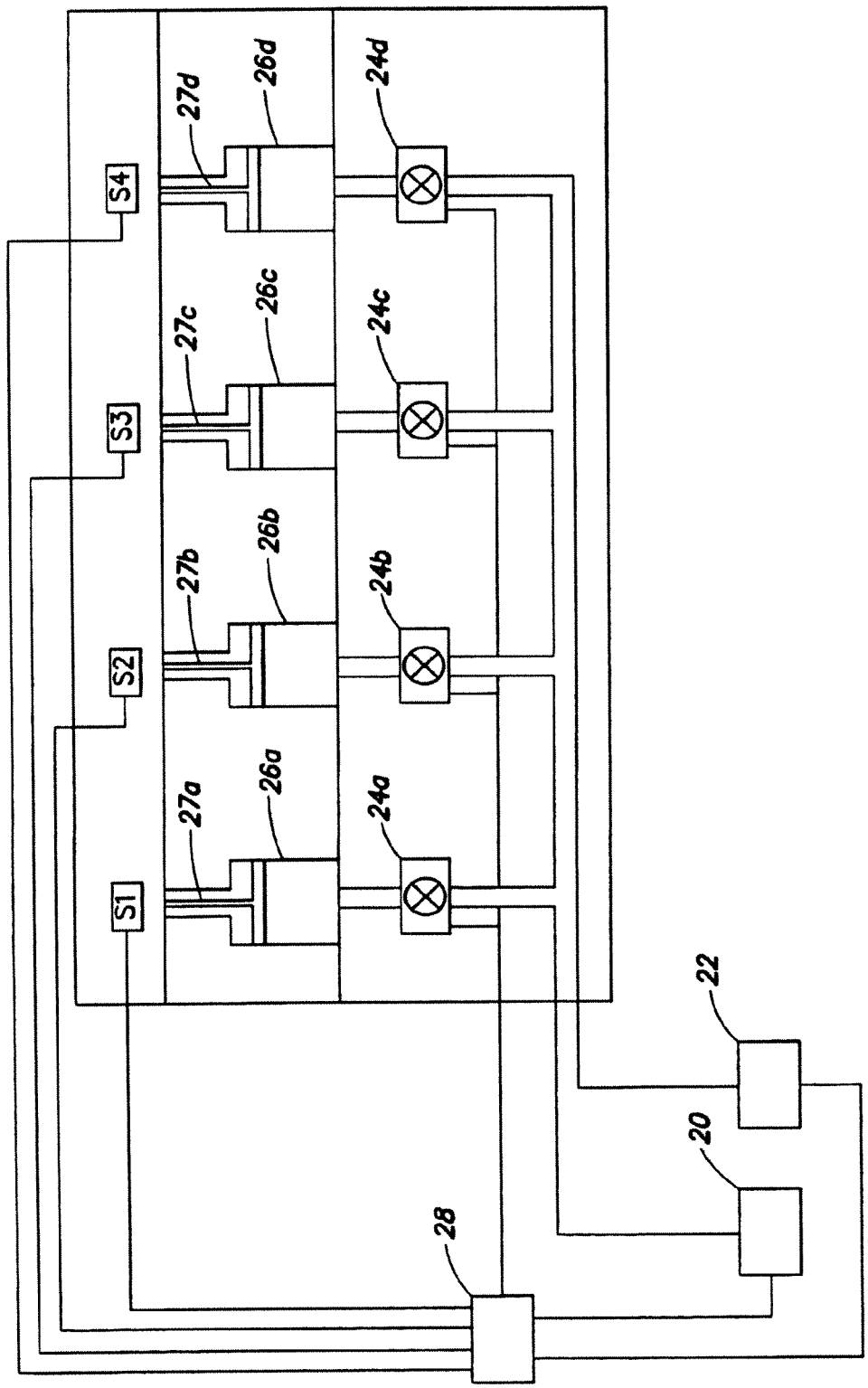
FIG. 2 is a schematic view of a multi-cavity mold system where the delivery of material to each cavity is controlled via a valve/valve pin the operation of which is controlled by a signal received from a sensor monitoring the flow of material into each cavity.

Alternatively, the operation of the actuators can be controlled by interconnecting the controller 28 to the drive control mechanisms that operate the pumps or other sources of drive fluid 20, 22 that are fed to the actuators 26a-26d (FIG. 2). The controller 28 includes a program that receives the property indicative signals from each sensor S1-S4 (or another signal resulting from receipt and/or processing of the sensor signals) and uses the signals as a variable for controlling movement of the valve pins 27a-27d in the manner described above. The controller 28 can control operation of either the drive sources 20, 22 for pumping fluid to the actuators or by controlling operation of the valves 24a-24d that enable drive fluid to flow to the actuators 26a-26d, or by controlling both. The controller 28 typically comprises a digital processor and associated memory. The controller 28 can take the form of a computer, a microprocessor or any other conventionally known digital electronic processing and storage mechanism. The controller 28 can comprise a unitary processing mechanism and/or associated memory or a plurality of such mechanisms that communicate and cooperate with each other to coordinate and achieve control over the drive elements that are responsible for the precisely timed operation of the various components of the injection mold apparatus such as the actuators, manifold and machine valves, the machine screw/barrel, the metering pots and all associated valves.

Figure 8A:
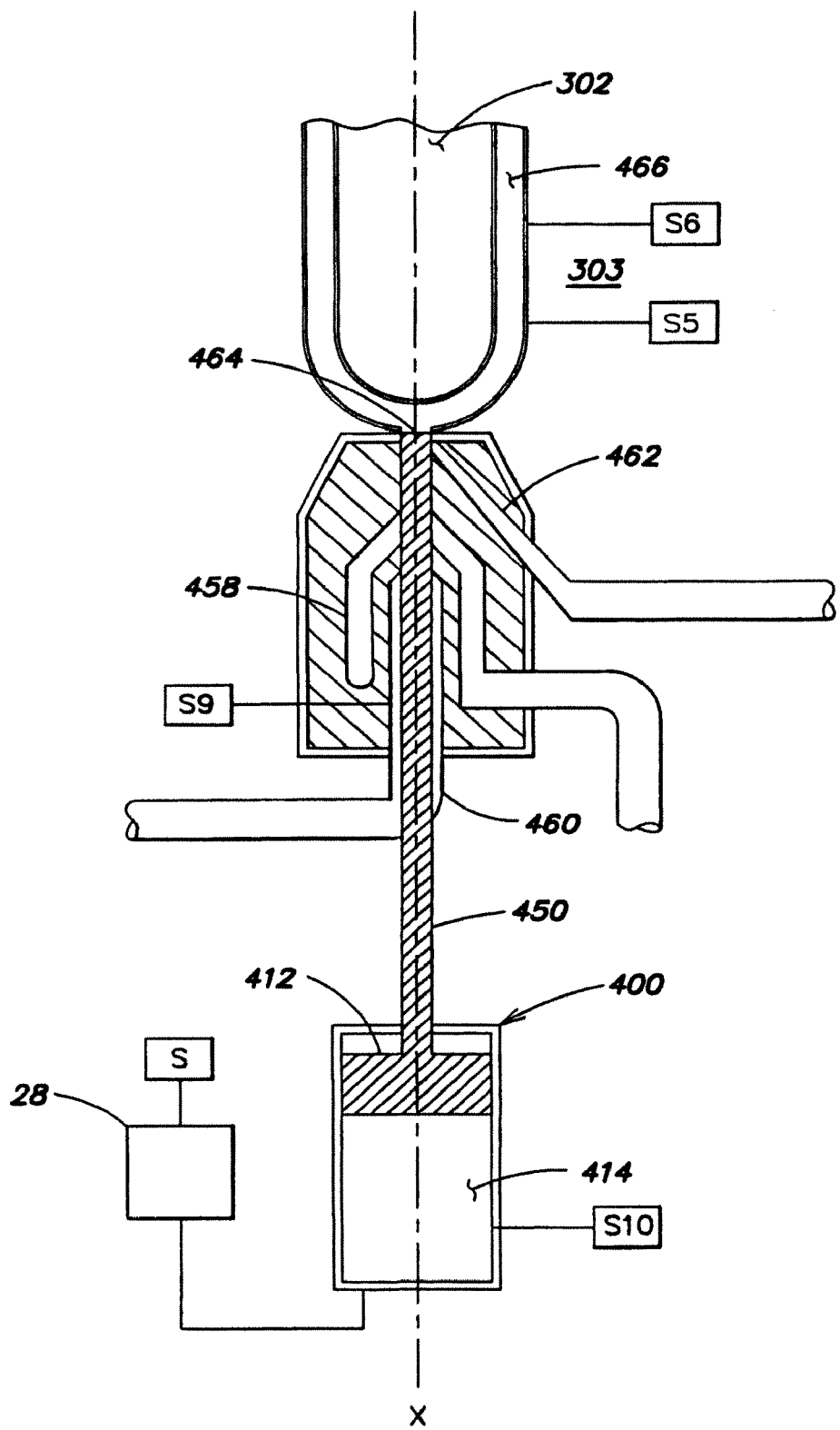
FIGS. 8A-8C are side, cross-sectional views of a three-position actuator/valve pin and associated three bore nozzle usable in select embodiments of the invention.
Figure 8B:
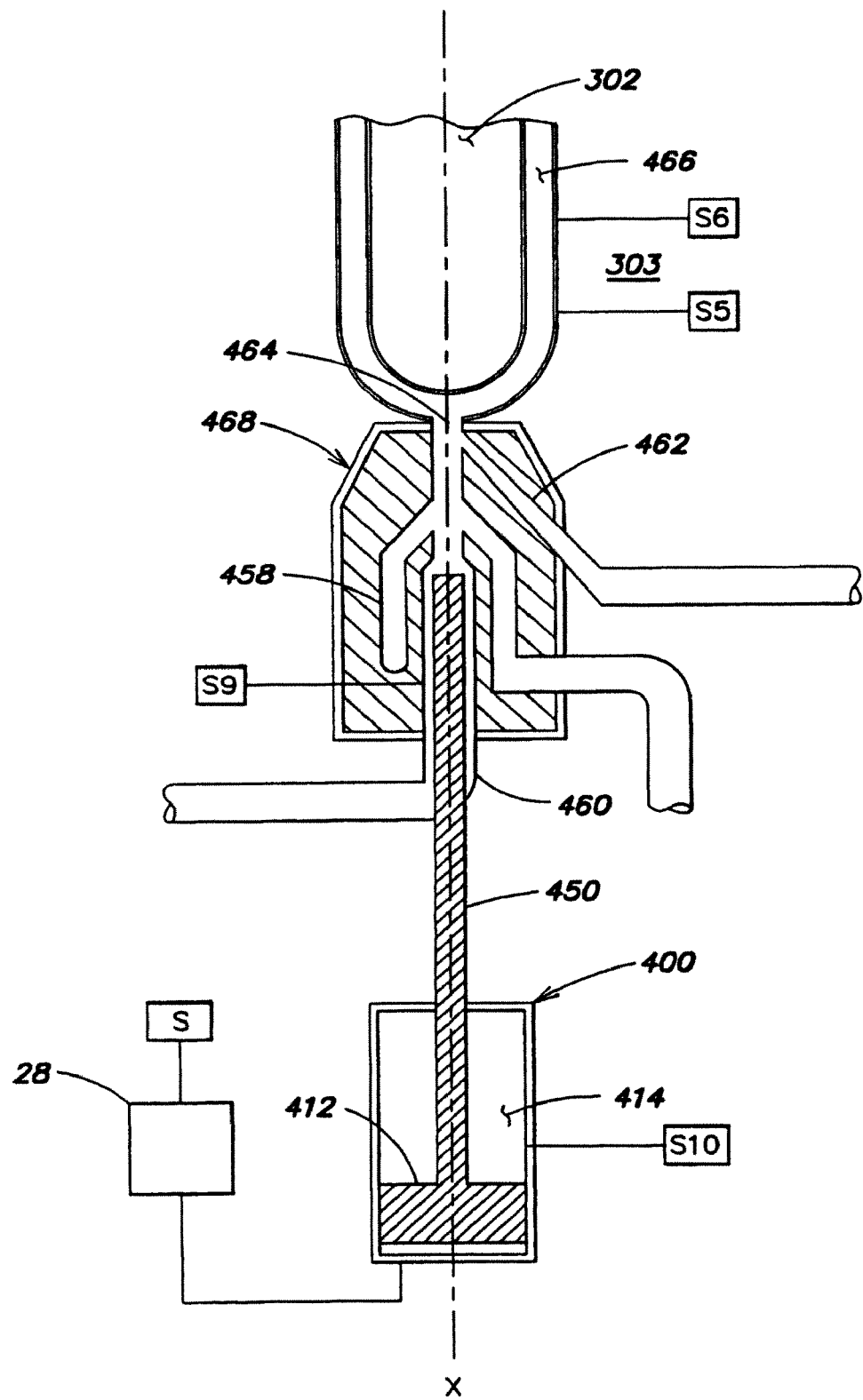
Figure 8C:
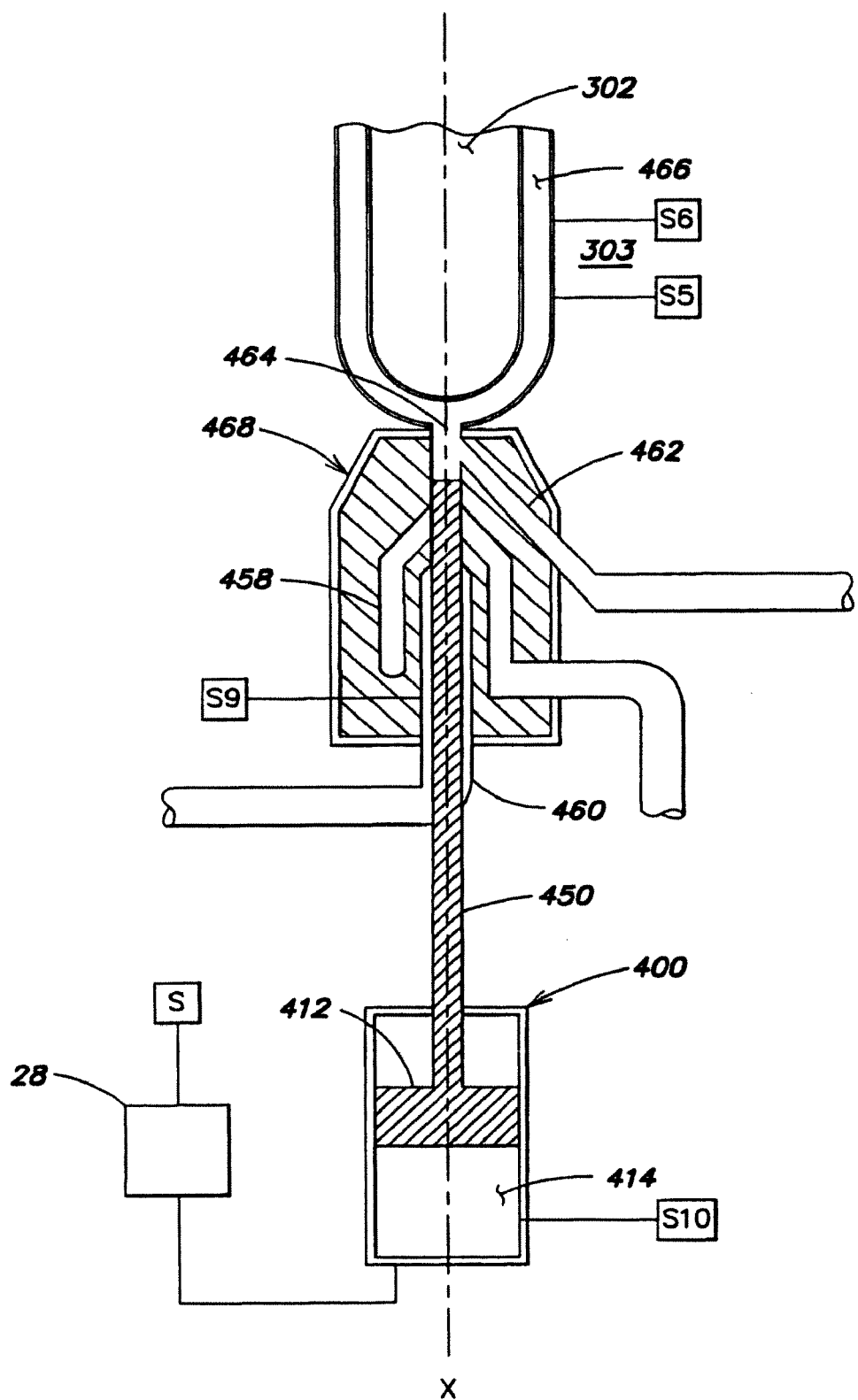

FIGS. 8A, 8B and 8C show one example of a nozzle design for delivering selected amounts of three materials in three successive shots to a cavity at predetermined times during the course of a single injection cycle. As shown, the actuator system comprises a single piston actuator 400 having a piston 412 sealably mounted within a chamber 414 for reciprocal fluid driven movement (hydraulic or pneumatic) of the piston 412 and any associated/attached parts such as valve pin 450 along axis X of mold chamber 466. In the manner described above with reference to FIG. 2, controller 28 directs the drive of piston 412 according to a program that receives and uses a signal received from a sensor S associated with a mold cavity 466 or nozzle 468 or their associated mold or manifold bodies. For purposes of discussion, S is intended to generically indicate one or more sensors located at any preselected position within the system sensing any preselected property(ies) of polymer material in the mold body such as temperature, pressure, flow rate or an optical property. In a multi-cavity system according to the invention, the controller 28 receives multiple signals from a multiplicity of such sensors S that are individually associated with separate mold cavities (which, in turn, are associated with separate nozzles 468 and actuator/pin assemblies) such that the controller 28 is simultaneously directing the drive of a multiplicity of actuator assemblies in a multi-cavity system during a single injection cycle and particularly during the period of time when the first shot is being delivered.

FIG. 8A shows the start position of the actuator 400 and the valve pin 450 in a typical three material shot injection cycle. In the closed position of FIG. 8A, all three material flow channels 458, 460 and 462 are closed such that there is no flow of any of the three materials into or through the gate passage 464 to the cavity 466. FIG. 8A also depicts the position of the actuator 400 and pin 450 at the conclusion of the first shot and at the conclusion of the entire injection cycle of all three shots.

FIG. 8B shows a second position of the valve pin 450 in which the pin is retracted from the start 8A position such that the first shot is ready for delivery. In the FIG. 8B position all of the nozzle bores 458, 460 and 462 are open. As described with reference to FIG. 3, the first shot of virgin material is delivered from the injection screw/barrel 20 through nozzle bore 460 in the nozzle 468. Upon movement of the pin 450 to the FIG. 8B position, flow of the first shot of first material commences. Once the first shot is underway, cavity 466 begins to fill in manner and profile as shown schematically in FIG. 7A. When the sensor S senses a predetermined value for a preselected property such as the pressure or temperature of the first material within the nozzle bore 460 (e.g. via sensor S9) or within the cavity 466 (e.g. via sensor S5 or S6), the sensed property signal is sent to and received by controller 28 and a value indicative of the sensed and received property signal is used in a predetermined program executable by the controller 28 to determine precisely when the pin 450 should be moved back to the closed position of FIG. 8A (and/or when manifold channel valve 38 (FIG. 3) should be closed) to stop the flow of the first material through channel 48 and nozzle bore 460.

For example, the sensor S5 or S6 or S9 can comprise a pressure transducer that sends a signal indicative of material pressure in mold cavity 466 or channel 460 to the controller 28. In one typical embodiment, the controller 28 program can include instructions that order actuator 400 to move pin 450 to the FIG. 8A position upon calculating the fill volume, e.g., based upon receipt of a signal from a sensor that indicates that the material pressure has reached a predetermined value at a predetermined time at a preselected location within cavity 466 (e.g. at a 20% fill position). Alternatively, the program could determine when fill of the first shot is complete by calculating flow rate and/or volume of flow into the cavity 466 based on the measured pressure of the material over a measured period of time by a sensor such as S9 or S5 or S6. Alternatively, the program can include instructions that order actuator 400 to move in response to receipt of a predetermined value of a signal from a sensor S10 that monitors the pressure of the drive fluid in actuator chamber 414. The drive fluid pressure is indicative of the material pressure being exerted on pin 450. Another example of a program is one that utilizes the time lapse or interval between receipt of signals from sensors S5 and S6 which might sense a property of the material within cavity 466 at the locations shown in FIG. 7a, the property sensed being a property such as temperature, pressure or an optical property. The program might then use such a sensed time interval or lapse to calculate the rate of flow of material within cavity 466 and utilize such a value to instruct the valve pin 450 to move to the position shown in FIG. 8A.

The precise algorithm or program used by the controller 28 to control the position of the pin 450 or the closing of valve 40 can be any of a wide variety of algorithms/programs depending on the choice of the programmer/designer of the system and depending particularly on the choice and location of sensors (pressure, temperature, optical and the like). Whatever the precise algorithm/program that is selected for controlling the start, adjustment and/or stoppage of material flow of the first material, the algorithm/program is designed to precisely control delivery of the first material to the cavity (ies) in order to achieve delivery of a precisely predetermined volume of the first material, e.g., the same precisely predetermined volume to any one individual cavity from one injection cycle to the next, and/or to deliver the same precisely predetermined volume of material to each and every one of a multitude of cavities in a multi-cavity application.

Thus, the use of such programmed control of a valve to individually control the volume of fill of the first shot can be employed to consistently obtain the same volume of fill for a single cavity between successive co-injection cycles. The use of such programmed control can also be used to obtain an equal or uniform volume of first shot fill among a multiplicity/plurality of cavities in a multi-cavity application.

As with screw/barrel 22 which feeds the third shot of material, the first shot screw/barrel 20 can be provided with a machine pot (not shown) in an arrangement similar to the arrangement of machine pot 56 relative to screw/barrel 22. However, the use of individual manifold metering pots (similar to 29 used for the second shot) is eliminated for the first shot because controller 28 and sensor S monitor and control completion of the necessary volume of material to cavity 466.

As noted with reference to FIGS. 1 and 4, the rate of fill of the individual cavities in a multi-cavity system can and will vary. In a most preferred embodiment, the program of the controller 28 includes instructions for delaying the start of delivery of the second shot of the second material to all cavities of a multi-cavity system until the program of the controller 28 determines, based on use of received signals from all relevant sensors at all cavities, that delivery of the first shot has been completed to all of the multiplicity of cavities. In such an embodiment, immediately upon determination by controller 28 that the first shot has been completed in all cavities, the controller 28 directs the valve pin 450 to return all bores to the closed position of FIG. 8A. The controller 28 then directs the valve pin 450 to move to the position shown in FIG. 8C where bore 462 is open and bores 458, 460 are closed (for delivery of the second shot). In an embodiment where manifold metering pots are employed, controller 28 directs the drive mechanism(s) for metering pots 29 associated with each individual cavity 466 to begin injection of the second shot of the second polymer material through each individual manifold channel portion 46 and through each individual second shot nozzle bore 462 and through each individual gate 464 into each individual cavity 466 to achieve the second shot fill profile shown in FIG. 7B.

Most preferably, the second shot of the second material (preferably a relatively small amount of an oxygen scavenging or barrier material, typically less than about 10% by weight of the first shot of material) is delivered by use of a metering pot 29. As noted previously, the use of an individual metering pot 29 can be eliminated. In an embodiment that does not use a metering pot, controller 28 can be interconnected to the drive mechanisms for valve 40 and/or screw/barrel 34 so as to direct operation of these components to stop delivery or flow of the second material to the cavity after the elapse of an empirically determined amount of time (when it is known that a sufficient amount of the second material has been delivered to either a single cavity in single cavity application or to all of a multitude of cavities in a multiple cavity application).

In a multi-cavity application where a third shot is delivered simultaneously to all cavities via a common manifold channel 58 (see FIG. 3), the third shot is preferably commenced upon completion of the second shot in/to all of the multitude of cavities. At the conclusion of the second shot, the valve pin 450 is in the position shown in FIG. 8C. As shown in FIG. 8B, when the pin 450 is further retracted to the FIG. 8B position, the terminal end of the third shot nozzle bore 458 is in fluid communication with the gate 464 and cavity 466. In an embodiment where a metering pot is used for delivery of the second shot, conclusion of the second shot can be determined by monitoring the point of full discharge of all metering pots 29 associated with all cavities. An alternative method is to separately begin delivery of the third shot at each individual cavity immediately upon determining that any individual metering pot 29 has been discharged. FIGS. 7C and 7D show a typical flow pattern and profile for delivery of the third shot of the third material over the course of the cycle of the third shot.

The program of the controller 28 can include instructions that process or otherwise utilize any one or more of a variety of property values sensed by appropriate sensors. For example, temperature, pressure or an optical property alone can be used as the sole signal sent to the controller and a variable indicative of such signal can be input to the program to determine the end point of the first shot. As shown in FIGS. 2 and 8A-8C sensors can be mounted to detect and sense a property of the material flowing in any one or more of a variety of different locations: S5 and S6 sensing material in a mold cavity, S9 sensing material in nozzle bore 460, and S10 sensing a property such as pressure of the drive fluid for the actuator 400.

The controller program or algorithm can utilize sensor signals pertaining to flow rate as the basis on which the end point of the first shot is determined to occur. Flow rate can be determined, for example, by the difference in time between which two sensors, e.g. S5 and S6 sense a pressure or temperature or optical property of the material flowing within a cavity 466. As shown, the sensors S5 and S6 are strategically located in different locations along the flow path within the cavity, S5 being upstream of S6. Successively located sensors such as S5 and S6 could alternatively be mounted to sense material flow within a nozzle bore or a manifold channel, in the same manner as sensor S9 senses a material property within bore 460.

Where a property such as pressure or temperature or flow rate is used by a program to determine the precise timing of the sending of an instruction to an operational component of the injection mold apparatus, it is preferable to initially conduct a series of trial and error runs of shots of first, second and/or third materials to empirically determine a profile of the selected sensed property over a cycle that produces the most satisfactory end product. Such an empirically determined ideal profile of material pressure, temperature or other selected property that exists at any given/selected sensor location during the conduct of such a trial run can be saved as a set of target profile data which the program can then use to compare against signals received from sensors during actual manufacturing cycles. When the program determines a match between the sensor signals received during an actual manufacturing run with the target and data stored in the controller 28 (e.g. material pressure in the cavity), the program can then, for example, determine that injection is complete or will be complete after a known period of time in a given cavity and instruct the valve 38 or actuator 400 (FIG. 3) to move to a closed position and thus terminate the first shot injection of first material.

These and other modifications would be readily apparent to the skilled person as included within the scope of the described invention.

The invention claimed is:

1. An injection molding apparatus for delivering multiple shots of materials to a plurality of mold cavities, the apparatus comprising:
   a plurality of mold cavities, wherein each cavity has a nozzle fluidly communicating with the cavity for delivering multiple shots of two or more materials to the cavity, and each cavity has sensors at two locations of flow in or into the cavity;
   a drive mechanism for initiating delivery of a first shot of a first material from a single source to the nozzles for the simultaneous filling of said plurality of mold cavities;
   a controller communicating with the sensors for receiving signals from the sensors of a property that is indicative of a volume or flow of the first material in or into the corresponding cavity;
   the controller including a program that uses the received signals to estimate, during delivery of the first shot, when the mold cavity will or has reached a predetermined fill volume by calculating a flow rate or fill volume of the first material or comparing the signal or a value calculated from the signal to a target value;
   the program generating an output signal for each cavity based on the estimate to control movement of a valve pin in the nozzle of each cavity to independently stop the delivery of the first shot to each cavity; and
   a drive mechanism for initiating delivery of a second shot of a second material to the cavities subsequent to the step of stopping the delivering of the first shot.

2. The apparatus of claim 1 wherein each nozzle has a first bore for delivery of the first shot, the valve pin being adapted to close the first bore for independently stopping delivery of the first shot to the cavity.

3. The apparatus of claim 1 wherein the program generates an output signal for initiating delivery of the second shot subsequent to stopping delivery of the first shot to all of the plurality of cavities.

4. The apparatus of claim 1 wherein the program generates an output signal for initiating delivery of the first material to all of the plurality of cavities from the single source of injection.

5. The apparatus of claim 1 wherein the program generates an output signal for initiating delivery of the second material to each cavity from a separate source of injection for each cavity.

6. The apparatus of claim 1 wherein the signal from the sensor is indicative of a volume of the first material for each cavity.

7. The apparatus of claim 1 wherein the signal from the sensor is indicative of a flow of the first material.

8. The apparatus of claim 1 wherein each nozzle has first and second bores for delivering the first and second materials respectively to the corresponding cavity, the valve pin reciprocating between positions to open and close the first and second bores, and the program including instructions to direct the valve pin to move between the positions to fill the cavity to a predetermined volume of the first material.

9. The apparatus of claim 1 wherein the two locations are within a bore of the nozzle or within the corresponding cavity.

10. The apparatus of claim 1 wherein the program calculates the flow rate of the first material.

11. The apparatus of claim 1 wherein the program calculates the fill volume of the first material.

12. The apparatus of claim 1 wherein
   each nozzle communicates with sources of pressurized feed of the first and second materials;
   the drive mechanism(s) drive at least one of the sources of feed and the valve pins for the nozzles, the drive mechanism starting and stopping flow of each of the first and second materials in a predetermined sequence through each nozzle;
   the controller is interconnected to the drive mechanism(s) and receives one or more of the signals from the two sensors and directs the drive mechanism(s) to deliver at least the first shot of the first material and the second shot of the second material after the first shot.

* * * * *